(12) United States Patent
Wang et al.

(10) Patent No.: US 8,133,630 B2
(45) Date of Patent: Mar. 13, 2012

(54) FUEL CELL MODULE WITH MEMBRANE SWELLING CONTROL STRUCTURE

(75) Inventors: Cheng Wang, Hsinchu (TW); Ching-Po Lee, Hsinchu (TW); Jin-Shu Huang, Hsinchu (TW); Nien-Hui Hsu, Hsinchu (TW)

(73) Assignee: Young Green Energy Co.,, Hsinchu County (TW)

( * ) Notice: Subject to any disclaimer, the term of this patent is extended or adjusted under 35 U.S.C. 154(b) by 1171 days.

(21) Appl. No.: 11/926,105

(22) Filed: Oct. 28, 2007

(65) Prior Publication Data

US 2008/0318112 A1 Dec. 25, 2008

(30) Foreign Application Priority Data

Jun. 22, 2007 (TW) ................................ 96122446 A (51) Int. Cl.
*H01M 8/24* (2006.01)
(52) U.S. Cl. .......................... 429/457; 429/512; 429/516
(58) Field of Classification Search .................. 429/457, 429/512, 516
See application file for complete search history.

(56) References Cited

U.S. PATENT DOCUMENTS

| 6,468,682 | B1 | 10/2002 | Fuglevand et al. |
| 6,852,438 | B2 * | 2/2005 | Gao et al. ....................... 429/518 |
| 2003/0064277 | A1 * | 4/2003 | Sugiura et al. ................... 429/38 |
| 2004/0053100 | A1 * | 3/2004 | Stanley et al. ................... 429/30 |
| 2004/0115513 | A1 | 6/2004 | Yang |
| 2005/0064266 | A1 | 3/2005 | Abdou et al. |
| 2005/0202297 | A1 * | 9/2005 | Schmitz et al. ................. 429/32 |
| 2007/0202381 | A1 * | 8/2007 | Diaz ............................... 429/35 |

FOREIGN PATENT DOCUMENTS

| TW | I235518 | 7/2005 |
| TW | I241048 | 10/2005 |
| TW | M290614 | 5/2006 |
| TW | I270997 | 1/2007 |
| WO | 0189016 | 11/2001 |
| WO | 03026049 | 3/2003 |

OTHER PUBLICATIONS

"Office Action of Taiwan Counterpart Application", issued on Jan. 5, 2011, p. 1-p. 4, in which the listed references were cited.

* cited by examiner

*Primary Examiner* — Barbara Gilliam
*Assistant Examiner* — Zachary Best
(74) *Attorney, Agent, or Firm* — Jianq Chyun IP Office (57) ABSTRACT

A fuel cell module including a membrane electrode assembly (MEA), a pressing plate, an anode collector, an anode flow channel plate, a cathode collector, and a cathode flow channel plate is provided. The MEA has a protrusion, and the pressing plate presses an edge of a cathode of the MEA. The pressing plate has a first opening to expose the protrusion. The anode collector is disposed on an anode of the MEA. The anode flow channel plate is disposed on anode collector. The anode collector is disposed between the anode and the anode flow channel plate. The cathode flow channel plate faces the cathode collector disposed on the cathode and the pressing plate to form a flow channel between an inner surface of the cathode flow channel plate and the cathode collector. The cathode flow channel plate has a concave portion corresponding to the protrusion.

4 Claims, 11 Drawing Sheets

FUEL CELL MODULE WITH MEMBRANE SWELLING CONTROL STRUCTURE

CROSS-REFERENCE TO RELATED APPLICATION

This application claims the priority benefit of Taiwan application serial no. 96122446, filed on Jun. 22, 2007. All disclosure of the Taiwan application is incorporated herein by reference.

BACKGROUND OF THE INVENTION

1. Field of the Invention

The present invention relates to a fuel cell, and more particularly to a fuel cell module of a fuel cell.

2. Description of Related Art

Fuel cells, having advantages of high efficiency, low noise, and no pollution, are an energy technology following the trend of the age. Fuel cells can be divided into many types, in which proton exchange membrane fuel cells (PEMFCs) and direct methanol fuel cells (DMFCs) are the common ones. For example, a fuel cell module of a direct methanol fuel cell includes a proton exchange membrane, a cathode and an anode respectively disposed on two sides of the proton exchange membrane.

In view of the above, a fuel (aqueous methanol solution) introduced into the anode generates a chemical reaction by the use of a catalyst and produces hydrogen ions and electrons. The hydrogen ions pass through a proton exchange membrane and goes to the cathode, and the electrons goes to the cathode through a circuit. Then, the hydrogen ions and electrons generate a chemical reaction with oxygen gas of the cathode by the use of the catalyst and produce water. At this time, the fuel cell forms a usable current due to the flow of the electrons.

Figure 1:
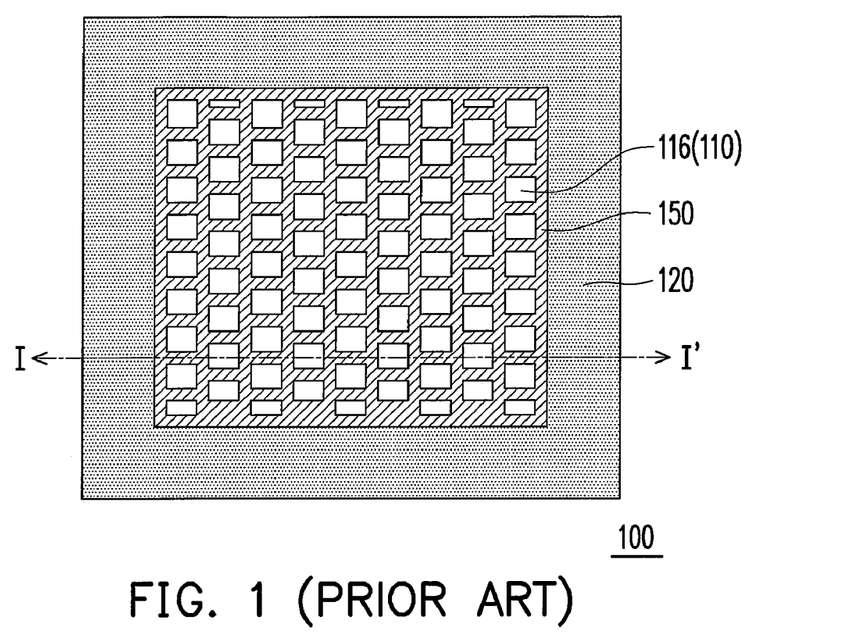
FIG. 1 is a top view showing a conventional fuel cell module.
Figure 2:
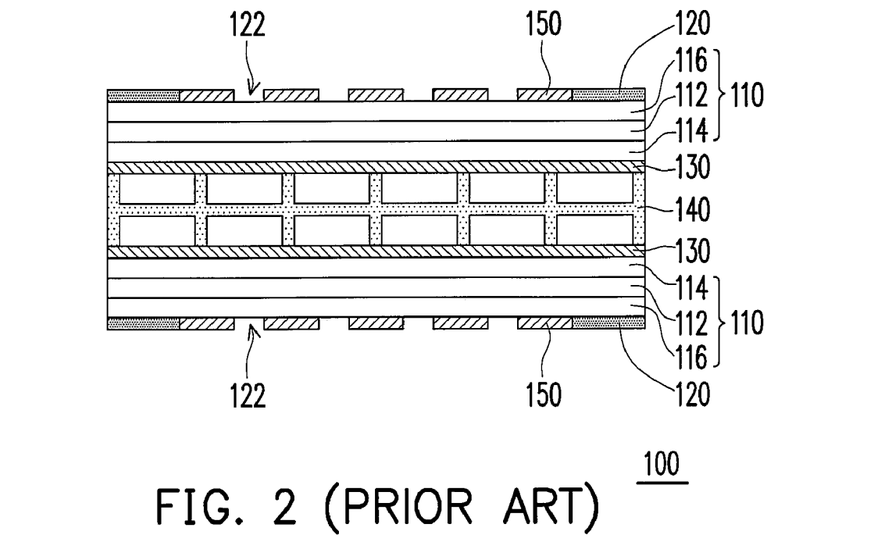
FIG. 2 is a cross-sectional view taken along line I-I' in FIG. 1.

FIG. 1 is a top view showing a conventional fuel cell module. FIG. 2 is a cross-sectional view taken along line I-I' in FIG. 1. Referring to FIGS. 1 and 2, a conventional fuel cell module 100 includes two membrane electrode assemblies (MEAs) 110, two printed circuit boards (PCBs) 120, two anode collectors 130, an anode flow channel plate 140, and two cathode collectors 150. Each of the MEAs 110 includes a proton exchange membrane 112, an anode 114, and a cathode 116, in which the anode 114 and the cathode 116 are respectively disposed on two sides of the proton exchange membrane 112. Each of the anode collectors 130 is disposed on one of the anodes 114, the anode flow channel plate 140 is disposed on the anode collector 130, and the anode collector 130 is disposed between the anode 114 and the anode flow channel plate 140. Each of the PCBs 120 presses on an edge of the cathode 116, and each of the PCBs 120 has an opening 122. Each of the cathode collectors 150 is disposed on one of the cathodes 116 and inside the opening 122 of each of the PCBs 120 correspondingly.

During the operation of the fuel cell module 100, the proton exchange membrane 112 of each of the MEAs 110 hydrates with water, so that the hydrogen ions produced by the anode 114 are delivered to the cathode 116. However, the proton exchange membrane 112 swells after absorbing water, thus leading to the expansion of the entire MEAs 110. Since the edge of the MEAs 110 is pressed by the PCBs 120, the central portion of the MEAs 110 protrudes outward, and the cathode collectors 150 also protrude accordingly.

Figure 3:
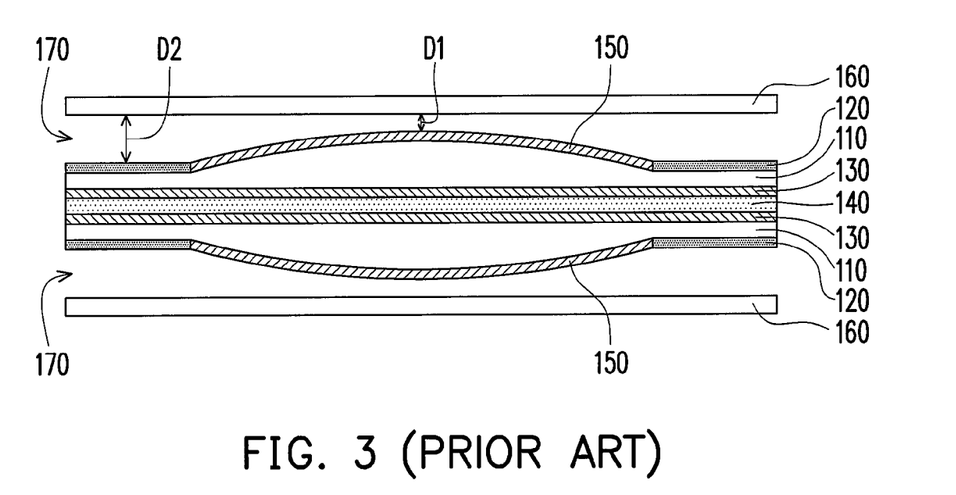
FIG. 3 is a schematic view showing the fuel cell module having the MEA in FIG. 2 after hydration.

FIG. 3 is a schematic view showing the fuel cell module having the MEA in FIG. 2 after hydration. Referring to FIG. 3, the fuel cell module 100 further includes two cathode flow channel plates 160 disposed beside each of the cathode collectors 150, so as to form a flow channel 170 between each of the cathode flow channel plates 160 and each of the MEA 110 correspondingly. However, since the central portion of the MEAs 110 and the cathode collectors 150 protrude outward, the height of the flow channel 170 is non-uniform. Thus, the height D1 of the central portion of the flow channel 170 is lower than the heights of two sides of the flow channel 170, so the flow resistance of the central portion of the flow channel 170 is greater than the flow resistances of two sides of the flow channel 170. Therefore, most of the gas flow flows through the two sides of the flow channel 170, such that the gas flow at the central portion of the flow channel 170 is too low. As a result, the reaction efficiency of the fuel cell module 100 is reduced.

SUMMARY OF THE INVENTION

Accordingly, the present invention is directed to a fuel cell module having better reaction efficiency.

An embodiment of the present invention provides a fuel cell module including a membrane electrode assembly (MEA), a pressing plate, an anode collector, an anode flow channel plate, a cathode collector, and a cathode flow channel plate. The MEA has a protrusion at a central region of the MEA, and the pressing plate presses on an edge of a cathode of the MEA. The pressing plate has a first opening to expose the protrusion. The anode collector is disposed on an anode of the MEA, the anode flow channel plate is disposed on the anode collector, and anode collector is disposed between the anode and the anode flow channel plate. The cathode collector is disposed on the cathode and inside the first opening. The cathode flow channel plate faces the cathode collector and the pressing plate to form a flow channel between an inner surface of the cathode flow channel plate and the cathode collector. The inner surface has a concave portion corresponding to the protrusion.

Another embodiment of the present invention provides a fuel cell module including a MEA, a pressing plate, an anode collector, an anode flow channel plate, a cathode collector, and a cathode flow channel plate. The MEA has a protrusion at a central region of the MEA, the pressing plate presses on an edge of a cathode of the MEA, and the pressing plate has a first opening to expose the protrusion. The anode collector is disposed on an anode of the MEA, the anode flow channel plate is disposed on the anode collector, and the anode collector is disposed between the anode and the anode flow channel plate. The cathode collector is disposed on cathode and inside the first opening, and the cathode flow channel plate faces the cathode collector and the pressing plate. The cathode flow channel plate includes a plate, a plurality of pressing strips, and a sheet. The plate faces the pressing plate and has a second opening corresponding to the protrusion. The pressing strips are disposed on the second opening, and two ends of each of the pressing strips are connected to a sidewall of the second opening. The sheet covers the second opening, in which a thickness of the plate is greater than a thickness of the sheet.

Another embodiment of the present invention provides a fuel cell module including an MEA, a pressing plate, an anode collector, an anode flow channel plate, a cathode collector, a plurality of pressing strips, a cathode flow channel plate, and a sheet. The MEA has a protrusion at a central region of the MEA, and the pressing plate presses on an edge of a cathode of the MEA. The pressing plate has a first opening to expose the protrusion. The anode collector is disposed on an anode of the MEA, the anode flow channel plate is disposed on the anode collector, and the anode collector is disposed between the anode and the anode flow channel plate. The cathode collector is disposed on cathode and inside the first opening. The pressing strips presses on the cathode collector, so as to press on the protrusion through the cathode collector. The cathode flow channel plate presses on the pressing strips, and the cathode flow channel plate has a second opening, in which the second opening is corresponding to the protrusion and exposes a part of each of the pressing strips and the cathode collector. The sheet covers the second opening.

In the fuel cell module, since the height of the flow channel formed between the cathode flow channel plate and the MEA is uniform, the problem of low reaction efficiency caused by the non-uniform height of the flow channel in the conventional art is solved.

In order to the make aforementioned and other objects, features and advantages of the present invention comprehensible, preferred embodiments accompanied with figures are described in detail below.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 4:
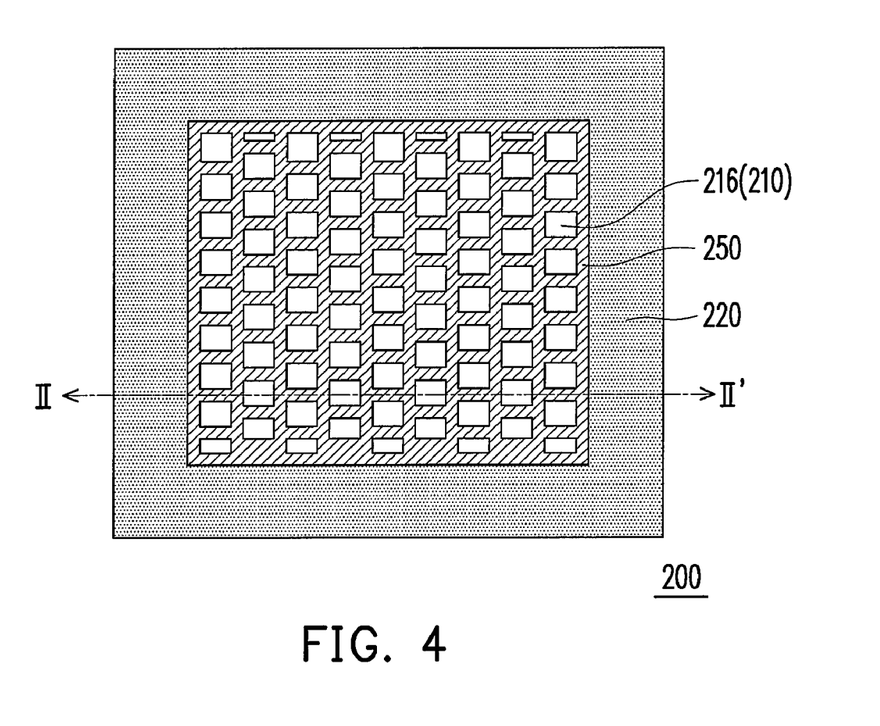
FIG. 4 is a top view showing a fuel cell module according to an embodiment of the present invention.
Figure 5:
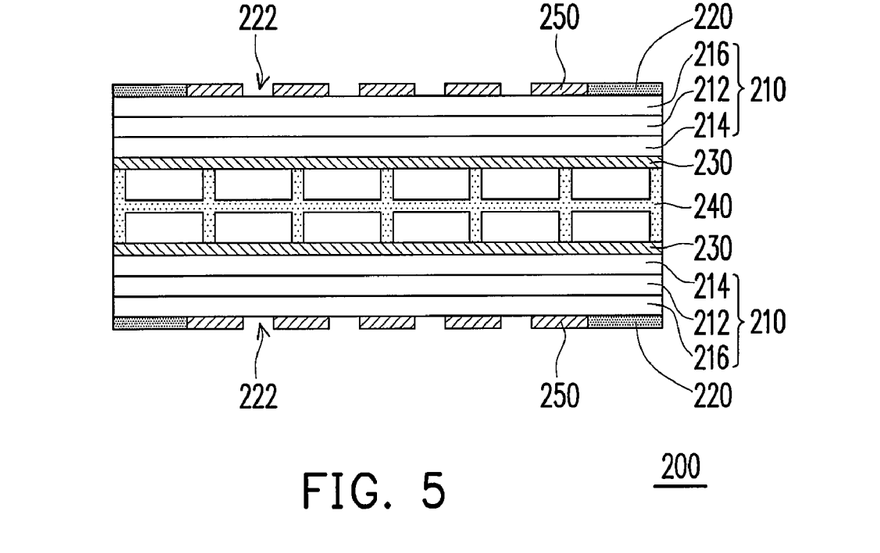
FIG. 5 is a cross-sectional view taken along line II-II' in FIG. 4.

FIG. 4 is a top view showing a fuel cell module according to an embodiment of the present invention, and FIG. 5 is a cross-sectional view taken along line II-II' in FIG. 4. Referring to FIGS. 4 and 5, a fuel cell module 200 of this embodiment includes two membrane electrode assemblies (MEAs) 210, two pressing plates 220, two anode collectors 230, an anode flow channel plate 240, and two cathode collectors 250. Each of the MEAs 210 includes a proton exchange membrane 212, an anode 214, and a cathode 216. The anode 214 and the cathode 216 are disposed on two sides of the proton exchange membrane 212, respectively. Additionally, each of the anode collectors 230 is disposed on one of the anodes 214, and each of the cathode collectors 250 is disposed on one of the cathodes 216. The anode flow channel plate 240 is disposed between the two anode collectors 230, and each of the anode collectors 230 is disposed between one of the anodes 214 and the anode flow channel plate 240. The pressing plate 220 is, for example, but not limited to, a PCB. Each of the pressing plates 220 presses on an edge of the cathode 216 of one of the MEAs 210, each of the pressing plates 220 has a first opening 222, and each of the cathode collectors 250 is disposed inside a corresponding first opening 222.

Figure 6:
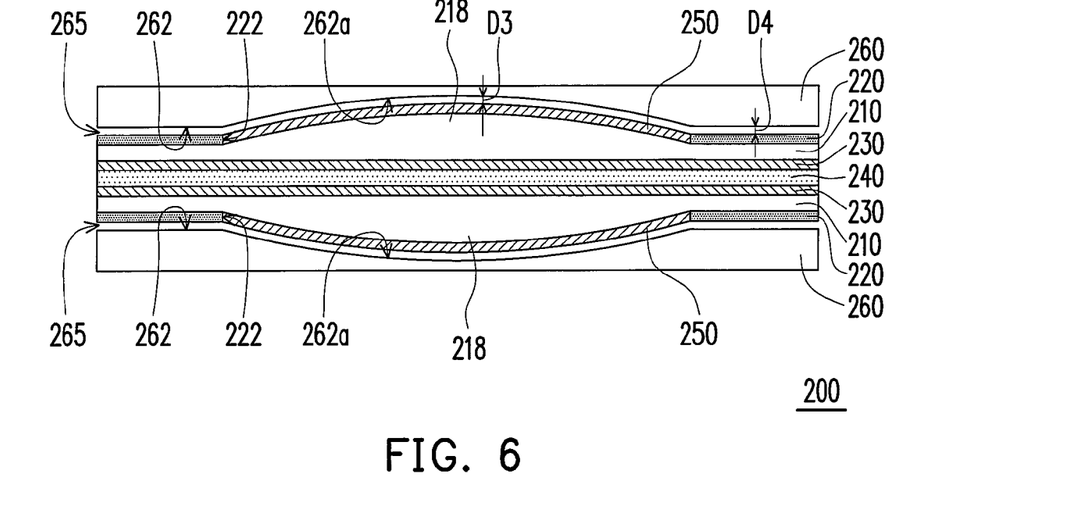
FIG. 6 is a schematic view showing the fuel cell module having the MEA in FIG. 4 after hydration.

FIG. 6 is a schematic view of the fuel cell module having the MEA in FIG. 4 after hydration. Referring to FIGS. 5 and 6, during the operation of the fuel cell module 200, the proton exchange membrane 212 of each of the MEAs 210 hydrates with water, so that the hydrogen ions produced by the anode 214 are delivered to the cathode 216. However, the proton exchange membrane 212 swells after absorbing water, thus leading to the expansion of the entire MEAs 210. Since the edges of the MEAs 210 are pressed by the PCBs 220, the central portion of the MEAs 210 protrudes outward, and the cathode collectors 250 also protrude accordingly.

In other words, after the proton exchange membrane 212 of each of the MEAs 210 absorbs water, each of the MEAs 210 has a protrusion 218 at a central region thereof. The first opening 222 of each of the pressing plates 220 exposes the corresponding protrusion 218. Additionally, the fuel cell module 200 further includes two cathode flow channel plates 260. Each of the cathode flow channel plates 260 faces an side of one of the cathode collectors 250 and the pressing plates 220, to form a flow channel 265 between an inner surface 262 of the cathode flow channel plate 260 and the cathode collector 250. The inner surface 262 has a concave portion 262a corresponding to the protrusion 218, so as to form a flow channel 265 with a uniform height between the inner surface 262 and the MEAs 210.

Figure 7:
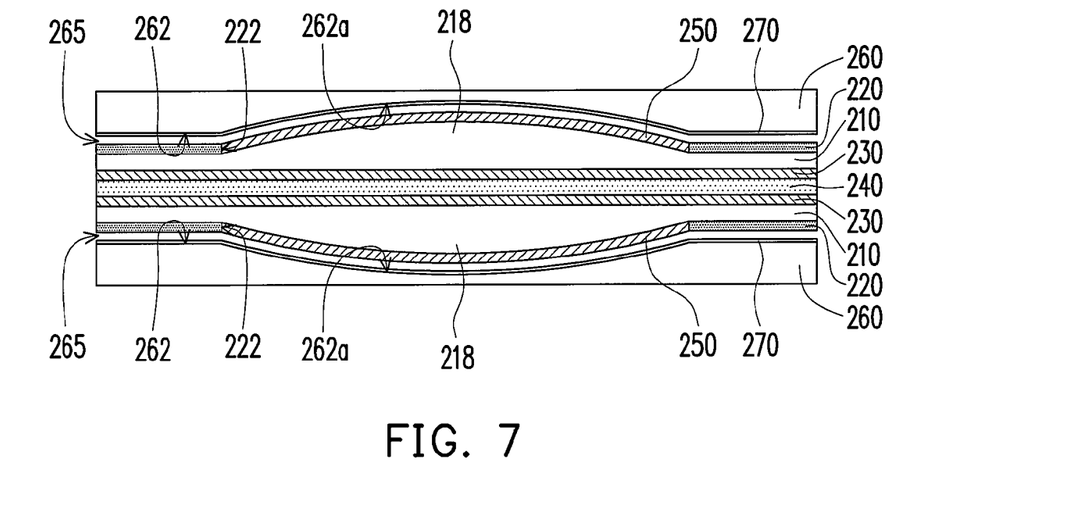
FIG. 7 is a schematic view showing a fuel cell module according to another embodiment of the present invention.

Since the height D3 of the central portion of the flow channel 265 is substantially identical with the heights D4 of two sides of the flow channel 265, the distribution of gas flow inside the flow channel 265 is uniform. Thus, the reaction efficiency of the fuel cell module 200 is improved. Additionally, the cathode flow channel plate 260 is a steel plate. In order to avoid the cathode flow channel plates 260 being in contact with the cathode collectors 250 and forming an electrical conduction, the fuel cell module 200 further includes an insulating layer 270 (as shown in FIG. 7) disposed on the cathode flow channel plate 260. Definitely, the insulating layer 270 is also disposed on the cathode collectors 250.

It should be noted that although the fuel cell module 200 in the above embodiments includes two MEAs 210, two pressing plates 220, two anode collectors 230, and two cathode collectors 250, those of ordinary skills in the art should know that the number of MEAs 210, the pressing plates 220, the anode collectors 230, and the cathode collectors 250 are one or more, and the number of these elements is not limited in the present invention.

Figure 8:
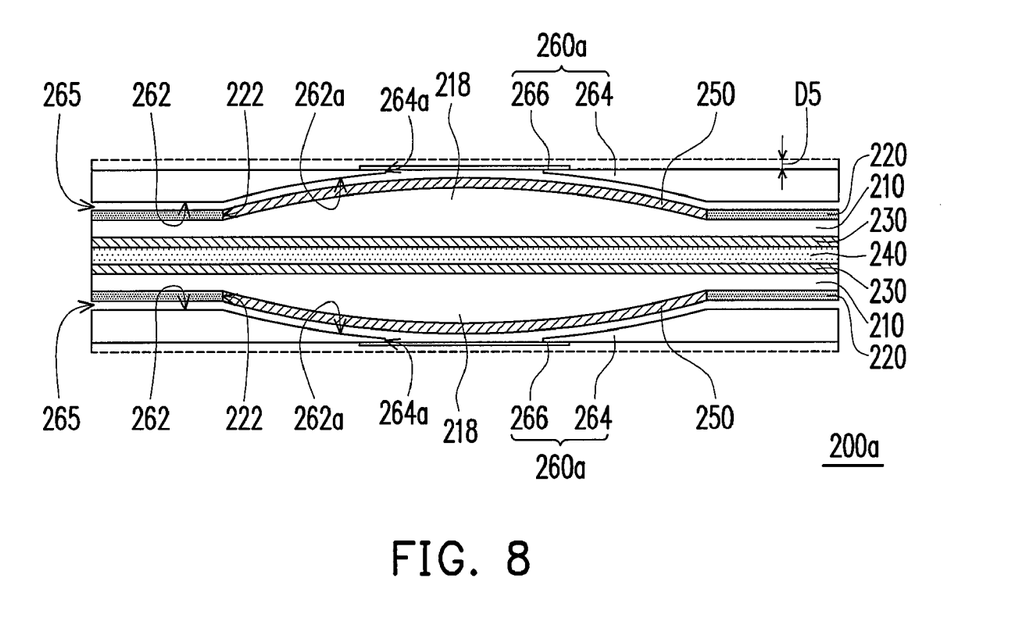
FIG. 8 is a schematic view showing a fuel cell module according to another embodiment of the present invention.

FIG. 8 is a schematic view of a fuel cell module according to another embodiment of the present invention. Referring to FIG. 8, a fuel cell module 200a is similar to the fuel cell module 200 in FIG. 6, so merely the difference therebetween is described hereinafter. In order to reduce the overall thickness of the fuel cell module 200a, each of the cathode flow channel plates 260a of the fuel cell module 200a adopts a thinning design. In detail, each of the cathode flow channel plates 260a includes a plate 264 and a sheet 266. The plate 264 has a second opening 264a corresponding to the protrusion 218, the sheet 266 covers the second opening 264a, and a thickness of the plate 264 is greater than a thickness of the sheet 266. The sheet 266 is, but not limited to, a plastic thin film or a metal sheet.

Compared with the cathode flow channel plate 260 in FIG. 6, the cathode flow channel plate 260a can be reduced by a thickness D5, thus achieving the purpose of thinning.

Figure 9:
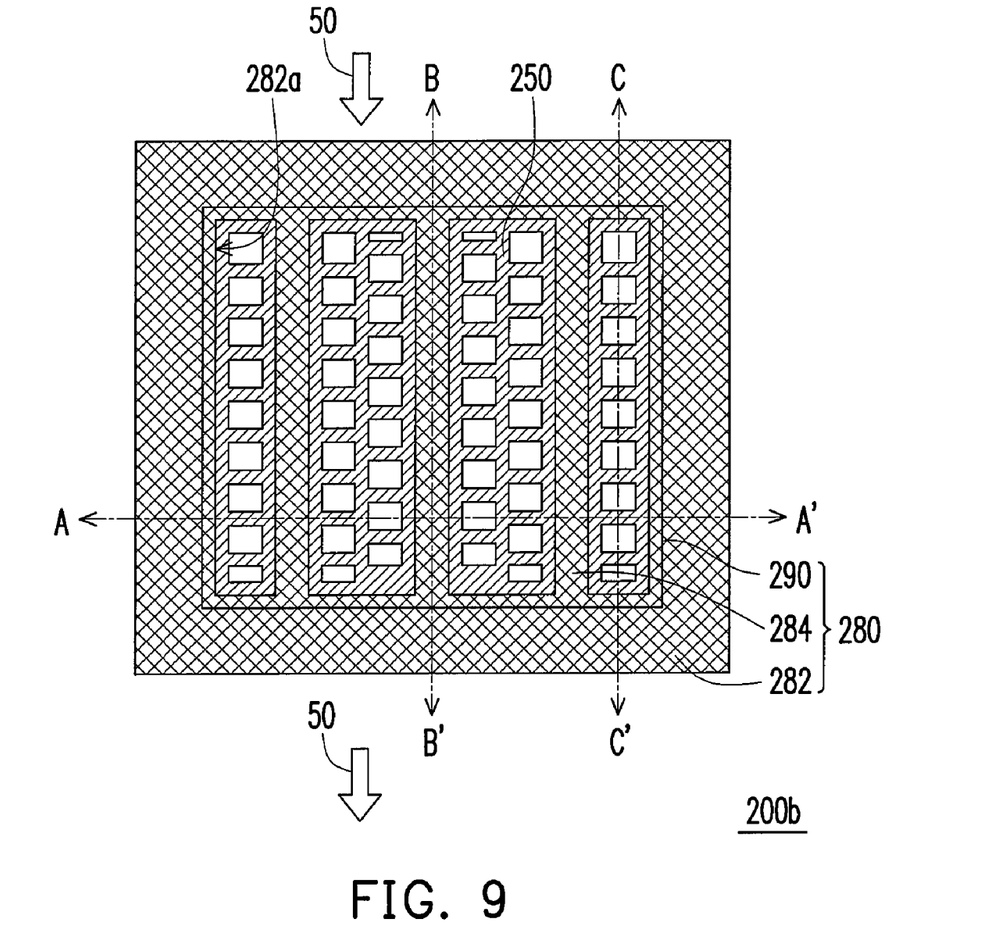
FIG. 9 is a top view showing a fuel cell module according to another embodiment of the present invention.
Figure 10A:
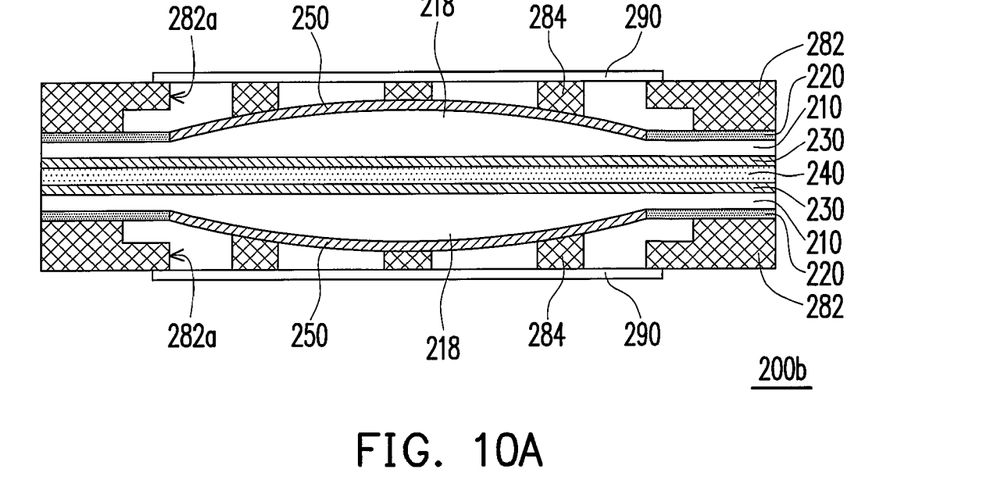
FIG. 10A is a cross-sectional view taken along line A-A' in FIG. 9.
Figure 10B:
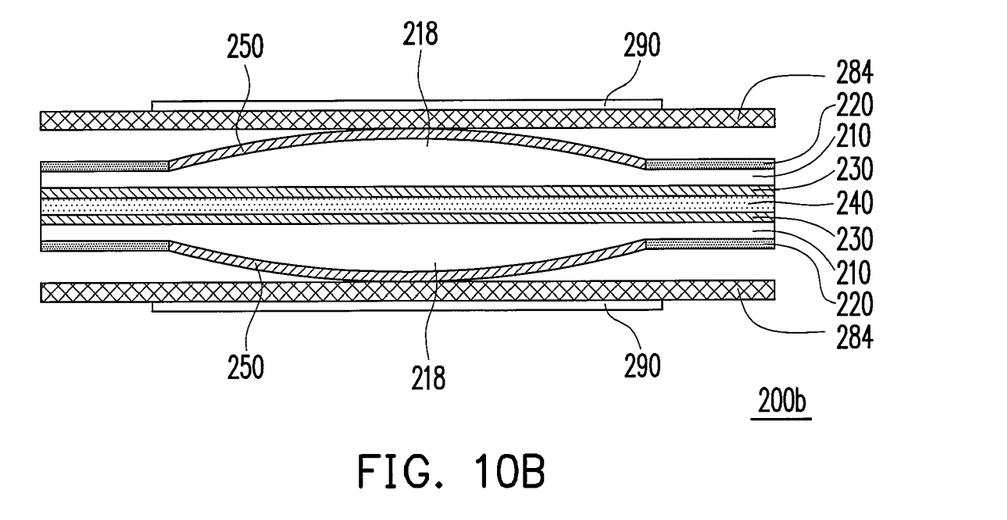
FIG. 10B is a cross-sectional view taken along line B-B' in FIG. 9.
Figure 10C:
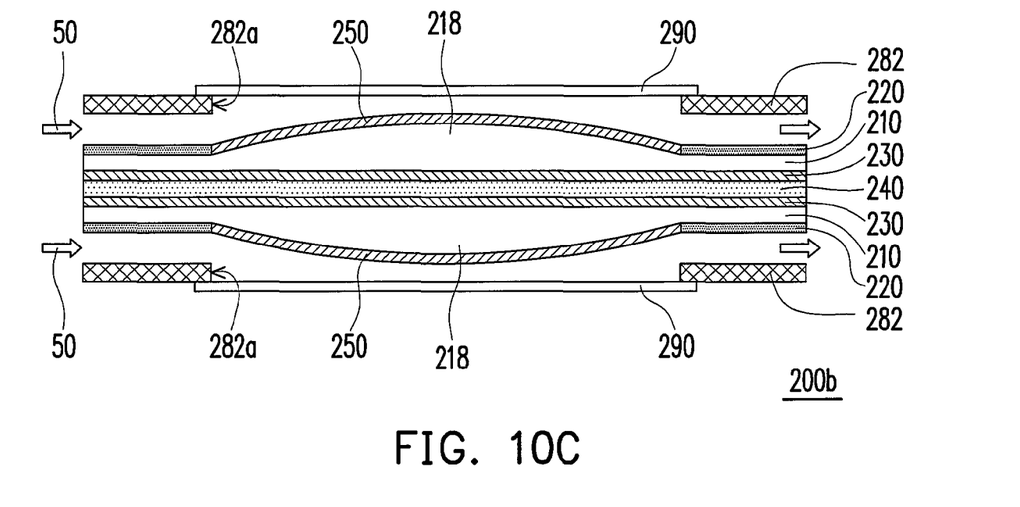
FIG. 10C is a cross-sectional view taken along line C-C' in FIG. 9.

FIG. 9 is a top view of a fuel cell module according to another embodiment of the present invention. FIG. 10A is a cross-sectional view taken along line A-A' in FIG. 9, FIG. 10B is a cross-sectional view taken along line B-B' in FIG. 9, and FIG. 10C is a cross-sectional view taken along line C-C' in FIG. 9. Referring to FIGS. 9, and 10A-10C, a fuel cell module 200b of this embodiment is similar to the fuel cell module 200, and the difference therebetween is the cathode flow channel plate, so merely the cathode flow channel plate is explained hereinafter. Each of the cathode flow channel plates 280 of the fuel cell module 200b includes a plate 282, a plurality of pressing strips 284, and a sheet 290. Each plate 282 is disposed on a corresponding pressing plate 220, and each plate 282 has a second opening 282a corresponding to the protrusion 218. The pressing strips 284 of each cathode flow channel plate 280 are disposed on the second opening 282a, and two ends of each of the pressing strips 284 are connected to a sidewall of the second opening 282a. The sheet 290 covers the second opening 282a. Additionally, the cathode flow channel plates 280 are steel plates. The sheet 290 may be, but not limited to, a plastic thin film or a metal sheet. The pressing strips 284 are, for example, substantially parallel to one another. The pressing strips 284 of each of cathode flow channel plates 280 and the plate 282 may be integrally formed.

As a compression ratio of the MEAs 210 must be maintained in a certain range (generally 30%), so that the fuel cell module 200b has better reaction efficiency. In this embodiment, the pressing strips 284 press on the cathode collectors 250, to press the protrusion 218 of the MEAs 210 through the cathode collectors 250, so as to maintain the compression ratio of the MEAs 210 in a certain range. Additionally, a gas flow 50 flows through the MEAs 210 via the gap between the corresponding plate 282 and pressing plate 220, so as to provide the gas required by the cathode to the MEAs 210. Additionally, the fuel cell module 200b covers the second opening 282a with the sheet 290, so as to prevent the gas flow 50 flowing out through the opening 282a.

In order to avoid the cathode flow channel plates 280 being in contact with the cathode collectors 250 and forming an electrical conduction, the fuel cell module 200b can further include an insulating layer (not shown) disposed on the cathode flow channel plates 280 or the cathode collectors 250.

Figure 11:
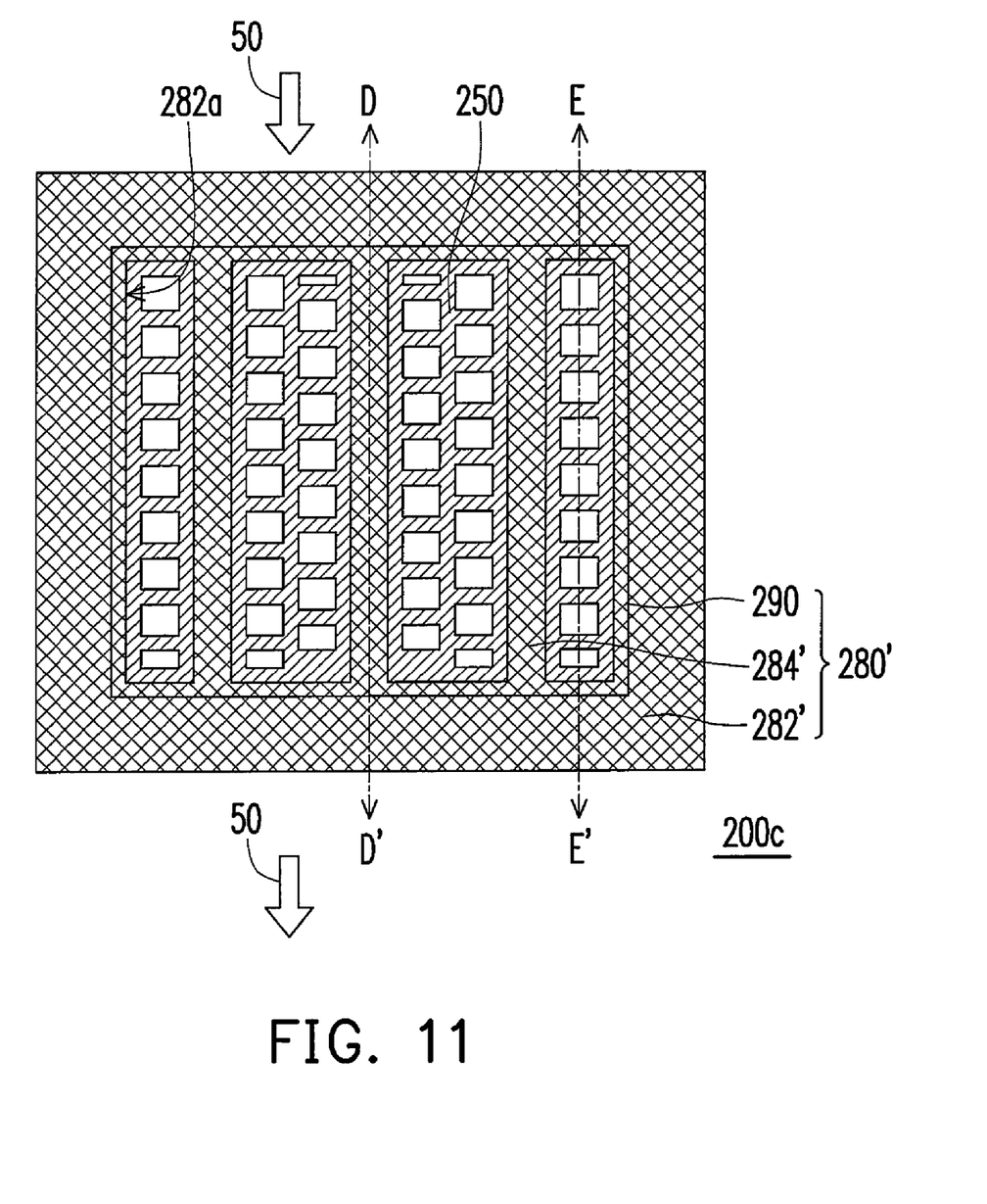
FIG. 11 is a top view showing a fuel cell module according to another embodiment of the present invention.
Figure 12A:
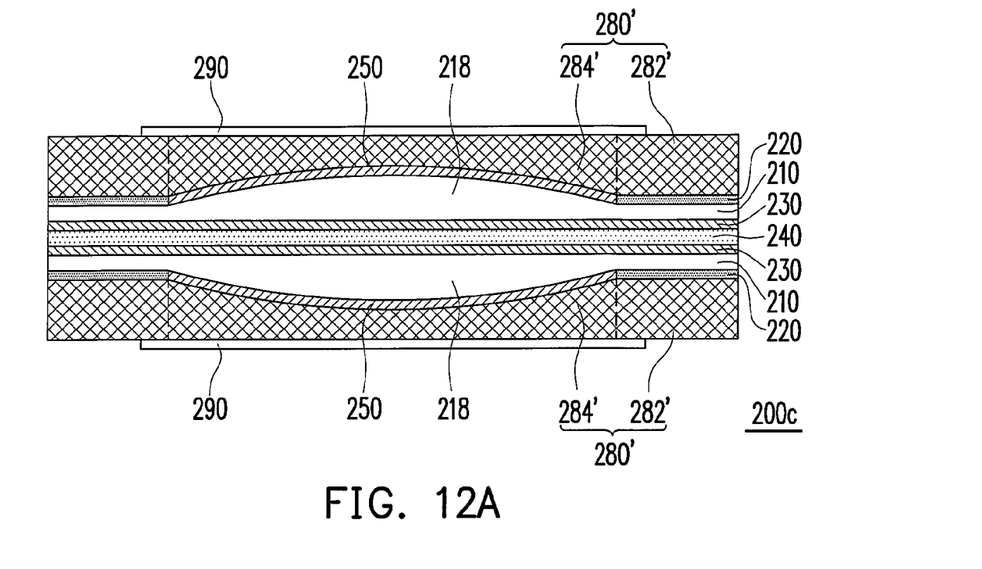
FIG. 12A is a cross-sectional view taken along line D-D' in FIG. 11.
Figure 12B:
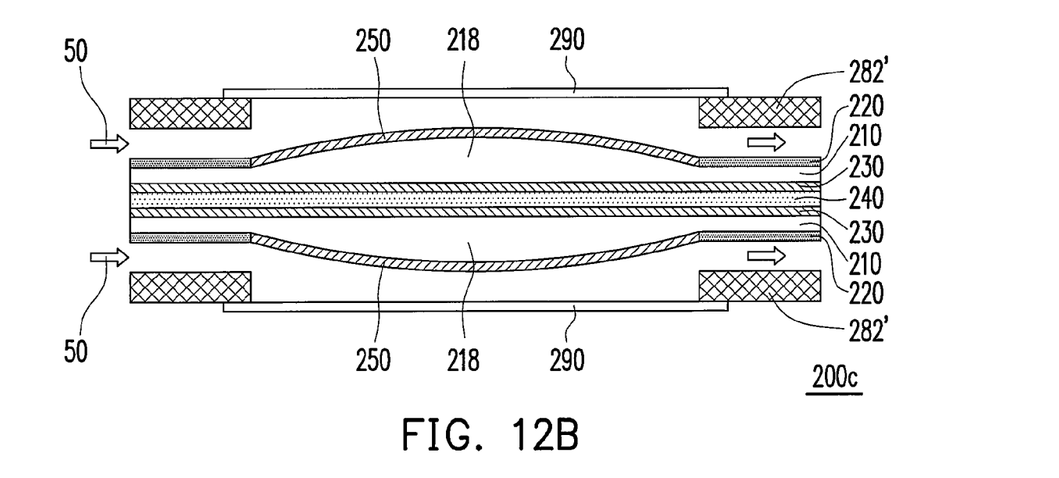
FIG. 12B is a cross-sectional view taken along line E-E' in FIG. 11.

FIG. 11 is a top view of a fuel cell module according to another embodiment of the present invention. FIG. 12A is a cross-sectional view taken along line D-D' in FIG. 11, and FIG. 12B is a cross-sectional view taken along line E-E' in FIG. 11. Referring to FIGS. 11, 12A, and 12B, a fuel cell module 200c is similar to the fuel cell module 200b, and the difference between them is the cathode flow channel plate. Each of the cathode flow channel plates 280' of the fuel cell module 200c includes a plate 282', a plurality of pressing strips 284', and a sheet 290. Each of the pressing strips 284' is arc-shaped, and a protruding direction of each of the pressing strips 284' is the same as a protruding direction of the corresponding protrusion 218. In this manner, the compression ratio of the MEAs 210 is more effectively maintained in a certain range by the pressing strips 284', so as to improve the reaction efficiency of the fuel cell module 200c. The sheet 290 covers the second opening 282a, and is, but not limited to, be made of a plastic thin film or a metal.

Figure 13:
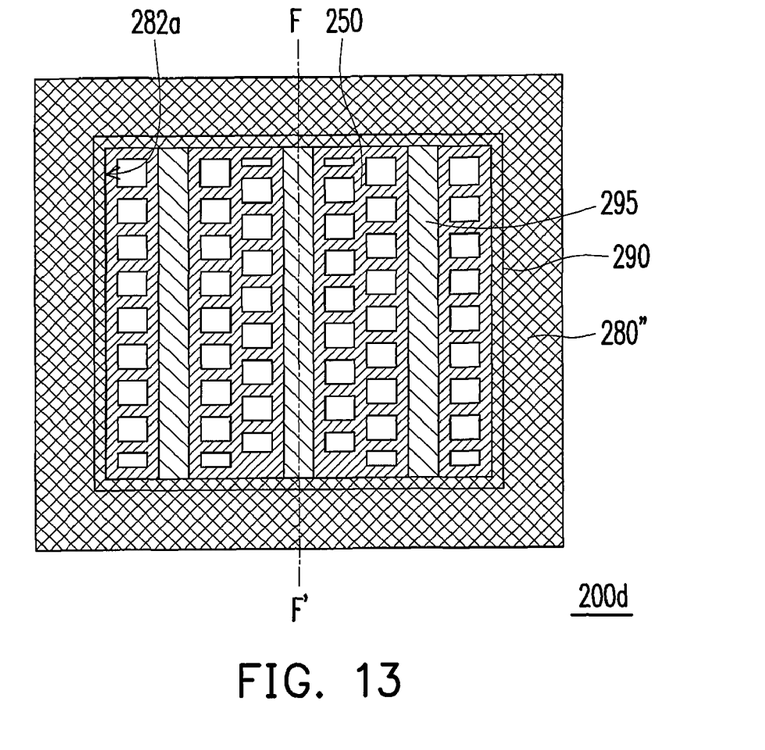
FIG. 13 is a top view showing a fuel cell module according to another embodiment of the present invention.
Figure 14:
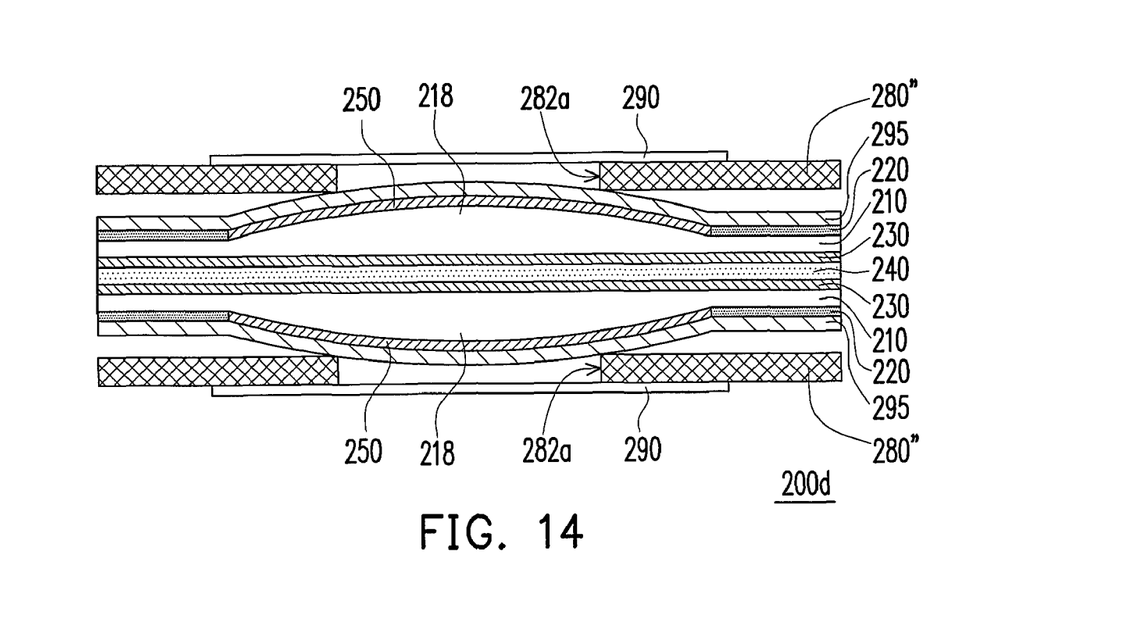
FIG. 14 is a cross-sectional view taken along line F-F' in FIG. 13.

FIG. 13 is a top view of a fuel cell module according to another embodiment of the present invention, and FIG. 14 is a cross-sectional view taken along line F-F' in FIG. 13. Referring to FIGS. 13 and 14, a fuel cell module 200d is similar to the fuel cell module 200c in FIG. 11, so merely the difference therebetween is explained hereinafter. In this embodiment, the fuel cell module 200d includes two cathode flow channel plates 280", a plurality of pressing strips 295, and a sheet 290, and each of the cathode flow channel plate 280" is a plate having a second opening 282a. Additionally, the pressing strips 295 press on the cathode collectors 250, so as to press the protrusion 218 through the cathode collectors 250. The cathode flow channel plates 280" press on the pressing strips 295. The second opening 282a of the cathode flow channel plates 280" is corresponding to the protrusion 218, and exposes a part of each of the pressing strips 295 and the cathode collectors 250. The sheet 290 covers the second opening 282a to prevent the gas flow from leakage through the second opening 282a.

The sheet 290 is a plastic thin film or a metal sheet. The pressing strips 295 are, for example, spring steels. The pressing strips 295 are, for example, substantially parallel to one another. The pressing strips 295 are disposed to effectively maintain the compression ratio of the MEAs 210 in a certain range, so as to improve the reaction efficiency of the fuel cell module 200d. Additionally, the fuel cell module 200d further includes an insulating layer (not shown) disposed on cathode flow channel plates 280" and the pressing strips 295, or disposed on the cathode collectors 250.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fuel cell module, comprising:
a membrane electrode assembly (MEA), having a protrusion at a central region of the membrane electrode assembly;
a pressing plate, pressing on an edge of a cathode of the membrane electrode assembly, and having a first opening to expose the protrusion;
an anode collector, disposed on an anode of the membrane electrode assembly;
an anode flow channel plate, disposed on the anode collector, and the anode collector being disposed between the anode and the anode flow channel plate;
a cathode collector, disposed on the cathode and inside the first opening; and
a cathode flow channel plate, facing the cathode collector and the pressing plate to form a flow channel between an inner surface of the cathode flow channel plate and the cathode collector, wherein the inner surface has a concave portion, a location and a shape of the concave portion corresponds to the protrusion, and a height of the flow channel between an inner surface of the cathode flow channel plate and the cathode collector is substantially identical to a height of the flow channel between an inner surface of the cathode flow channel plate and the pressing plate.

2. The fuel cell module as claimed in claim 1, wherein the cathode flow channel plate comprises:
a plate, having a second opening corresponding to the protrusion; and
a sheet, covering the second opening, wherein a thickness of the plate is greater than a thickness of the sheet.

3. The fuel cell module as claimed in claim 2, wherein the sheet is a plastic film or a metal sheet.

4. The fuel cell module as claimed in claim 1, further comprising an insulating layer disposed on the cathode flow channel plate or the cathode collector.

* * * * *